United States Patent
Hattori et al.

[11] Patent Number: 5,662,853
[45] Date of Patent: Sep. 2, 1997

[54] AFFIXATION MEMBER FOR DECORATING OR PROTECTING STRUCTURES AND METHODS OF MAKING SAME

[75] Inventors: Jiro Hattori, Atsugi; Shinji Torigoe, Sagamihara; Norihito Shibahara, Hachioji; Osamu Sawajiri, Sagamihara, all of Japan

[73] Assignee: Minnesota Mining Manufacturing Company, St. Paul, Minn.

[21] Appl. No.: 563,903

[22] Filed: Nov. 22, 1995

Related U.S. Application Data

[63] Continuation of Ser. No. 285,861, Aug. 4, 1994, abandoned.

[30] Foreign Application Priority Data

Aug. 5, 1993 [JP] Japan ................... 5-194685

[51] Int. Cl.$^6$ .................................... B29C 45/32
[52] U.S. Cl. ............... 264/219; 249/61; 264/221; 264/255; 264/278; 264/317; 264/318; 425/DIG. 12
[58] Field of Search ................... 264/23, 69, 71, 264/165, 167, 219, 317, 318, 313, 297.2, 328.8, DIG. 44, 243, 255, 271.1, 276, 278; 249/61; 425/DIG. 12

[56] References Cited

U.S. PATENT DOCUMENTS

| | | | |
|---|---|---|---|
| 3,031,730 | 5/1962 | Morin | 24/204 |
| 3,192,589 | 7/1965 | Pearson | 24/204 |
| 3,266,113 | 8/1966 | Flanagan, Jr. | 24/204 |
| 3,320,649 | 5/1967 | Naimer | 28/72 |
| 3,408,705 | 11/1968 | Kayser et al. | 24/204 |
| 3,537,946 | 11/1970 | Truax et al. | 161/66 |
| 3,773,580 | 11/1973 | Provost | 156/66 |
| 3,849,840 | 11/1974 | Yamada et al. | 24/204 |
| 3,899,803 | 8/1975 | Brumlik | 24/204 |
| 3,899,805 | 8/1975 | McMillan | |
| 3,916,055 | 10/1975 | Wagner | 428/161 |
| 4,147,580 | 4/1979 | Buell | 156/291 |
| 4,169,303 | 10/1979 | Lemelson | 24/204 |
| 4,216,257 | 8/1980 | Schams et al. | 428/93 |
| 4,226,068 | 10/1980 | Wadsworth | 52/508 |
| 4,290,174 | 9/1981 | Kalleberg | 24/204 |
| 4,290,832 | 9/1981 | Kalleberg | 156/72 |
| 4,322,875 | 4/1982 | Brown et al. | 24/204 |
| 4,364,214 | 12/1982 | Morgan et al. | 52/311 |
| 4,454,183 | 6/1984 | Wollman | 428/92 |
| 4,563,380 | 1/1986 | Black et al. | 428/100 |

(List continued on next page.)

FOREIGN PATENT DOCUMENTS

| | | |
|---|---|---|
| 767115 | 10/1971 | Belgium . |
| 0 024 360 | 3/1981 | European Pat. Off. . |
| 0 258 015 | 3/1988 | European Pat. Off. . |
| 1526215 | 4/1968 | France . |
| 2101195 | 3/1972 | France . |
| 2111530 | 6/1972 | France . |
| 2148440 | 3/1973 | France . |
| 2 264 209 | 3/1974 | France ............. F16B 5/07 |
| 2217945 | 9/1974 | France . |

(List continued on next page.)

*Primary Examiner*—Jill L. Heitbrink
*Attorney, Agent, or Firm*—Gary L. Griswold; Walter N. Kirn; Charles D. Levine

[57] ABSTRACT

A method making an affixation member including a body for affixation to a surface of a structure and means for fastening the body to the surface. The fastening means including an interengaging fastener member which has a base secured to the body and a plurality of headed stems arranged on the base. The fastening means is formed by flowing molten material into a base mold, a destructible stem mold and a head mold. The base mold and head mold are separated, and the destructible stem mold and the molded interengaging fastener member are placed within a cavity of a body mold. An affixation member fixedly supporting the interengaging fastener member is molded in the cavity of the body mold. The body mold is separated from the molded affixation member, and the stem mold is destructibly removed from the interengaging fastener member fixedly supported on the molded affixation member.

3 Claims, 6 Drawing Sheets

U.S. PATENT DOCUMENTS

| | | | |
|---|---|---|---|
| 4,673,542 | 6/1987 | Wigner et al. | 264/275 |
| 4,693,921 | 9/1987 | Billarant et al. | 264/46.7 |
| 4,700,525 | 10/1987 | Nieboer et al. | 52/698 |
| 4,706,914 | 11/1987 | Ground | 248/74.3 |
| 4,710,190 | 12/1987 | Wood et al. | 604/389 |
| 4,710,414 | 12/1987 | Northrup et al. | 428/43 |
| 4,769,895 | 9/1988 | Parkins | 29/450 |
| 4,776,068 | 10/1988 | Smirlock et al. | 24/442 |
| 4,784,890 | 11/1988 | Black | 428/100 |
| 4,814,036 | 3/1989 | Hatch | 264/276 |
| 4,819,309 | 4/1989 | Behymer | 24/576 |
| 4,894,060 | 1/1990 | Nestegard | 604/391 |
| 4,933,224 | 6/1990 | Hatch | 428/100 |
| 4,984,339 | 1/1991 | Provost et al. | 24/452 |
| 5,040,275 | 8/1991 | Eckhardt et al. | 24/447 |
| 5,077,870 | 1/1992 | Melbye et al. | 24/452 |
| 5,100,400 | 3/1992 | Mody et al. | 604/391 |
| 5,140,727 | 8/1992 | Dais et al. | 24/587 |
| 5,149,573 | 9/1992 | Kobe et al. | 428/93 |
| 5,179,767 | 1/1993 | Allan | 24/442 |
| 5,201,101 | 4/1993 | Rouser et al. | 24/575 |
| 5,212,853 | 5/1993 | Kaneko | 24/452 |
| 5,235,731 | 8/1993 | Anzai et al. | 24/576 |
| 5,242,646 | 9/1993 | Torigoe et al. | 264/219 |
| 5,339,499 | 8/1994 | Kennedy et al. | 24/452 |
| 5,369,852 | 12/1994 | Higashinaka | 24/446 |
| 5,384,939 | 1/1995 | Weber | 24/306 |
| 5,398,387 | 3/1995 | Torigoe et al. | 24/452 |

FOREIGN PATENT DOCUMENTS

| | | | |
|---|---|---|---|
| 2279544 | 2/1976 | France . | |
| 2304758 | 10/1976 | France . | |
| 2 372 953 | 6/1978 | France . | |
| 2 311 970 | 9/1974 | Germany . | |
| 24 26 136 | 1/1975 | Germany . | |
| 19 14 818 | 3/1976 | Germany . | |
| 26 36 623 | 2/1978 | Germany . | |
| 26 56 035 | 6/1978 | Germany . | |
| 28 25 479 | 12/1979 | Germany . | |
| 1-238 805 | 9/1989 | Japan | A44B 18/00 |
| 2-134012 | 11/1990 | Japan . | |
| 4-123106 | 4/1991 | Japan . | |
| 4-338402 | 5/1991 | Japan . | |
| 913321 | 11/1994 | Japan . | |
| 913322 | 11/1994 | Japan . | |
| 609 407 | 2/1979 | Switzerland . | |
| 993188 | 5/1965 | United Kingdom . | |
| 1031807 | 6/1966 | United Kingdom . | |
| 1111740 | 5/1968 | United Kingdom . | |
| 1115212 | 5/1968 | United Kingdom . | |
| 1132140 | 10/1968 | United Kingdom . | |
| 1163898 | 10/1969 | United Kingdom . | |
| 1169101 | 10/1969 | United Kingdom . | |
| 1171582 | 11/1969 | United Kingdom . | |
| 1182926 | 3/1970 | United Kingdom . | |
| 1 350 009 | 4/1974 | United Kingdom . | |
| 1 354 281 | 5/1974 | United Kingdom . | |
| 1474977 | 5/1977 | United Kingdom . | |
| 1 501 170 | 2/1978 | United Kingdom . | |
| 1 510 558 | 5/1978 | United Kingdom . | |
| 2 002 741 | 2/1979 | United Kingdom . | |
| 1553585 | 10/1979 | United Kingdom . | |
| 1 593 506 | 7/1981 | United Kingdom . | |
| WO89/08201 | 8/1989 | WIPO | F16B 5/07 |
| WO92/19119 | 12/1992 | WIPO | A44B 18/00 |

AFFIXATION MEMBER FOR DECORATING OR PROTECTING STRUCTURES AND METHODS OF MAKING SAME

This is a continuation of application Ser. No. 08/285,861 filed Aug. 4, 1994, now abandoned.

TECHNICAL FIELD

The present invention relates to an affixation member for affixation to a surface of a structure, and particularly to an affixation member including a plurality of headed stems arranged on a base.

BACKGROUND OF THE INVENTION

Various types of metal or polymeric affixation members are attached to structures, such as a vehicle body, a motorcycle body, a boat body, kitchen appliances, or walls in high traffic areas for protection or ornamentation. The term "affixation member" as used herein generally designates strip-like or plate-like members directly or indirectly attached to a structure for ornamental or protective purposes.

Several methods have been used to affix such an affixation member to a structure, including using an adhesive or a double-coated adhesive tape. Alternatively, the affixation members may be fixed to the objects by protrusions provided to the surfaces of the affixation members, whereby the protrusions are inserted and fit into corresponding holes provided to the objects in male/female relationship. The affixation members may be fixed to the objects by using separate fixing means such as bolts. These fixing means, such as protrusions or bolts, may be used in combination with the adhesive or double-coated adhesive tape.

When such affixation members are fixed to a structure by an adhesive or a double-coated adhesive tape, there is a problem in that a longer installation time is necessary because of a time required for solidification of the adhesive. When protrusions or bolts are used as fixing means, it is necessary to form holes at accurate locations on an objective structure, thus complicating the manufacturing process. Moreover, when such holes are formed in a metallic outer panel of a structure, problems such as water leaks and rust may arise.

Affixation members may also have to be removed from a structure for repair, replacement, or for providing access to an interior space. Thus, it is important to detach the affixation members without damaging same, so as to enable the detached affixation members to be reused and to reduce repair costs. However, according to the conventional fixing method using an adhesive or a double-coated adhesive tape, the affixation members may be damaged because they are bent during removal from the structure. The engaging protrusions provided to the affixation members are generally structured so that they cannot be easily disengaged from holes of the objects, such as car body panels, and the protrusions are often broken during the removal operation. Hence, it may also be difficult to reuse affixation members that include engaging protrusions.

Furthermore, according to conventional fixing methods that use adhesives or bolts, when the affixation members are placed in a high temperature environment, the affixation members expand against a fixing force, thereby the portions not fastened by bolts may be raised from the objective structures or the portions adhered by the adhesive may be partially peeled off therefrom.

In view of the foregoing, it is desirable to provide an affixation member for releasable affixation to a structure, such that the affixation member can be quickly fixed to the structure without machining the structure, and can be easily detached from the structure without being damaged.

SUMMARY OF THE INVENTION

The present invention provides an affixation member for affixation to a surface of a structure, the surface including a plurality of arranged headed stems adjoining and projecting from the surface, each of the headed stems including a stem and a head connected to a distal end of the stem, wherein the affixation member comprises a body for affixation to the surface, and means for fastening the body to the surface, the fastening means including a plurality of headed stems arranged on the body in a predetermined spaced relationship, each of the headed stems including a stem integrally formed in and projecting from the body and a head connected to a distal end of the stem; whereby the headed stems of the affixation member are interengaged in a given pressure with the headed stems of the surface to affix the affixation member to the surface.

In the above affixation member, the headed stems of the fastening means for preferably arranged on the body in a plurality of rows extending substantially straight in a predetermined direction and parallel to each other, the headed stems of one row being shifted in relation to the headed stems of the other adjacent row, and a distance between adjacent headed stems in each row being shorter than a distance between the adjacent rows. The affixation member may be affixed to a surface of a structure for protecting the surface. Alternatively, the affixation member may be affixed to a surface of a structure for decorating the surface. Further, the affixation member may be affixed to a surface of a body structure of a vehicle.

The present invention also provides an affixation member for affixation to a surface of a structure, the surface including a plurality of headed stems arranged on and projecting from the surface, each of the headed stems including a stem and a head connected to a distal end of the stem, wherein the affixation member comprises a body for affixation to the surface, and means for fastening the body to the surface, the fastening means comprising an interengaging fastener member which includes a base fixed to the body by an insert-molding process and a plurality of headed stems arranged on the base in a predetermined spaced relationship, each of the headed stems including a stem projecting from the base and a head connected to a distal end of the stem; whereby the headed stems of the affixation member are interengaged in a given pressure with the headed stems of the surface to affix the affixation member to the surface.

The present invention further provides an affixation member affixed to a surface of a structure, the surface including a plurality of headed stems arranged on and projecting from the surface, each of the headed stems including a stem and a head connected to a distal end of the stem, wherein the affixation member comprises a body for affixation to the surface, and means for fastening the body to the surface, the fastening means comprising an interengaging fastener member which includes a base fixed to the body by a welding process and a plurality of headed stems arranged on the base in a predetermined spaced relationship, each of the headed stems including a stem projecting from the base and a head connected to a distal end of the stem; whereby the headed stems of the affixation member are interengaged in a given pressure with the headed stems of the surface to affix the affixation member to the surface.

According to another aspect of the present invention, a method of making an affixation member comprising a body for affixation to a surface of a structure and means for fastening the body to the surface, the fastening means including a plurality of headed stems arranged on the body in a predetermined spaced relationship, each of the headed stems including a stem formed in and projecting from the body and a head connected to a distal end of the stem, is provided; the method comprising the steps of providing a permanent body mold having a cavity for molding the body; providing a destructible stem mold having a plurality of cavities for molding the stems of the headed stems; providing a permanent head mold having a plurality of cavities for molding the heads of the headed stems; securing the destructible stem mold adjacent the permanent body mold with the cavities of the stem mold in fluidic communication with the cavity of the body mold, and securing the permanent head mold adjacent to the destructible stem mold with the cavities of the head mold in fluidic communication with the cavities of the stem mold; flowing a molten polymeric material into the molds through an inlet passageway in one of the body mold, the stem mold and the head mold, so as to form the body, and the stems and heads of the headed stems; integrally forming the affixation member from the polymeric material within the body mold, the stem mold and the head mold; separating the body mold and the head mold from the destructible stem mold and the molded affixation member; and destructibly removing the stem mold from the molded affixation member.

The present invention further provides an affixation member comprising a body for affixation to a surface of a structure and means for fastening the body to the surface, the fastening means including a plurality of headed stems arranged on the body in a predetermined spaced relationship, each of the headed stems including a stem formed in and projecting from the body and a head connected to a distal end of the stem, the affixation member is made by the steps of providing a permanent body mold having a cavity for molding the body; providing a destructible stem mold having a plurality of cavities for molding the stems of the headed stems; providing a permanent head mold having a plurality of cavities for molding the heads of the headed stems; securing the destructible stem mold adjacent the permanent body mold with the cavities of the stem mold in fluidic communication with the cavity of the body mold, and securing the permanent head mold adjacent to the destructible stem mold with the cavities of the head mold in fluidic communication with the cavities of the stem mold; flowing a molten polymeric material into the molds through an inlet passageway in one of the body mold, the stem mold and the head mold, so as to form the body, and the stems and heads of the headed stems; integrally forming the affixation member from the polymeric material within the body mold, the stem mold and the head mold; separating the body mold and the head mold from the destructible stem mold and the molded affixation member; and destructibly removing the stem mold from the molded affixation member.

According to further aspect of the present invention, a method of making an affixation member comprising a body for affixation to a surface of a structure and means for fastening the body to the surface, the fastening means comprising an interengaging fastener member which includes a base secured to the body and a plurality of headed stems arranged on the base in a predetermined spaced relationship, each of the headed stems including a stem projecting from the base and a head connected to a distal end of the stem, is provided; the method comprising the steps of providing a permanent base mold having a cavity for molding the base of the interengaging fastener member, a destructible stem mold having a plurality of cavities for molding the stems of the headed stems, and a permanent head mold having a plurality of cavities for molding the heads of the headed stems; providing a permanent body mold having a cavity for molding the body of the affixation member; securing the destructible stem mold adjacent the permanent base mold with the cavities of the stem mold in fluidic communication with the cavity of the base mold, and securing the permanent head mold adjacent to the destructible stem mold with the cavities of the head mold in fluidic communication with the cavities of the stem mold; flowing a molten polymeric material into the base mold, the stem mold and the head mold through an inlet passageway in one of these molds, and integrally forming the base, and the stems and the heads of the interengaging fastener member from the polymeric material; separating the base mold and the head mold from the destructible stem mold and the molded interengaging fastener member; placing the destructible stem mold and the molded interengaging fastener member at a predetermined position within the cavity for molding the body in the permanent body mold; flowing a molten polymeric material into the body mold through an inlet passageway in the body mold; molding the affixation member fixedly supporting the interengaging fastener member at the predetermined position from the polymeric material within the body mold; separating the body mold from the molded affixation member; and destructibly removing the stem mold from the interengaging fastener member fixedly supported on the molded affixation member.

The present invention further provides an affixation member comprising a body for affixation to a surface of a structure and means for fastening the body to the surface, the fastening means comprising an interengaging fastener member which includes a base secured to the body and a plurality of headed stems arranged on the base in a predetermined spaced relationship, each of the headed stems including a stem projecting from the base and a head connected to a distal end of the stem, the affixation member is made by the steps of providing a permanent base mold having a cavity for molding the base of the interengaging fastener member, a destructible stem mold having a plurality of cavities for molding the stems of the headed stems, and a permanent head mold having a plurality of cavities for molding the heads of the headed stems; providing a permanent body mold having a cavity for molding the body of the affixation member; securing the destructible stem mold adjacent the permanent base mold with the cavities of the stem mold in fluidic communication with the cavity of the base mold, and securing the permanent head mold adjacent to the destructible stem mold with the cavities of the head mold in fluidic communication with the cavities of the stem mold; flowing a molten polymeric material into the base mold, the stem mold and the head mold through an inlet passageway in one of these molds, and integrally forming the base, and the stems and the heads of the interengaging fastener member from the polymeric material; separating the base mold and the head mold from the destructible stem mold and the molded interengaging fastener member; placing the destructible stem mold and the molded interengaging fastener member at a predetermined position within the cavity for molding the body in the permanent body mold; flowing a molten polymeric material into the body mold through an inlet passageway in the body mold; molding the affixation member fixedly supporting the interengaging fastener member at the predetermined position from the polymeric material within the body mold; separating the body mold from the molded affixation member; and destructibly removing the stem mold from the interengaging fastener member fixedly supported on the molded affixation member.

According to further aspect of the present invention, a method of making an affixation member comprising a body for affixation to a surface of a structure and means for fastening the body to the surface, the fastening means including a plurality of headed stems arranged on the body in a predetermined spaced relationship, each of the headed stems including a stem formed in and projecting from the body and a head connected to a distal end of the stem, is provided; the method comprising the steps of moving two backing layers from generally opposite directions around a pair of arcuate spaced guides and away from the guides in the same direction along parallel paths; feeding spaced parallel flexible, resilient polymeric monofilaments between the arcuate spaced guides from the sides thereof opposite said parallel paths; alternately planting U-shaped lengths of the monofilaments in two backing layers passing through the arcuate spaced guides, so as to bond the U-shaped lengths of the monofilaments to the backing layers, and so as to form linear lengths of the monofilaments extending between the U-shaped lengths generally orthogonally to the backing layers moving along the parallel paths; severing the monofilaments midway between the backing layers to form stems projecting from each of the backing layers; heating the terminal ends of the stems formed from the severed monofilaments to form heads having arcuate surfaces, thereby forming headed stems arranged on the backing layers; and forming the bodies from the backing layers having the headed stems.

The present invention further provides an affixation member comprising a body for affixation to a surface of a structure and means for fastening the body to the surface, the fastening means including a plurality of headed stems arranged on the body in a predetermined spaced relationship, each of the headed stems including a stem formed in and projecting from the body and a head connected to a distal end of the stem, the affixation member is made by the steps of moving two backing layers from generally opposite directions around a pair of arcuate spaced guides and away from the guides in the same direction along parallel paths; feeding spaced parallel flexible, resilient polymeric monofilaments between the arcuate spaced guides from the sides thereof opposite said parallel paths; alternately planting U-shaped lengths of the monofilaments in two backing layers passing through the arcuate spaced guides, so as to bond the U-shaped lengths of the monofilaments to the backing layers, and so as to form linear lengths of the monofilaments extending between the U-shaped lengths generally orthogonally to the backing layers moving along the parallel paths; severing the monofilaments midway between the backing layers to form stems projecting from each of the backing layers; heating the terminal ends of the stems formed from the severed monofilaments to form heads having arcuate surfaces, thereby forming headed stems arranged on the backing layers; and forming the bodies from the backing layers having the headed stems.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1A:
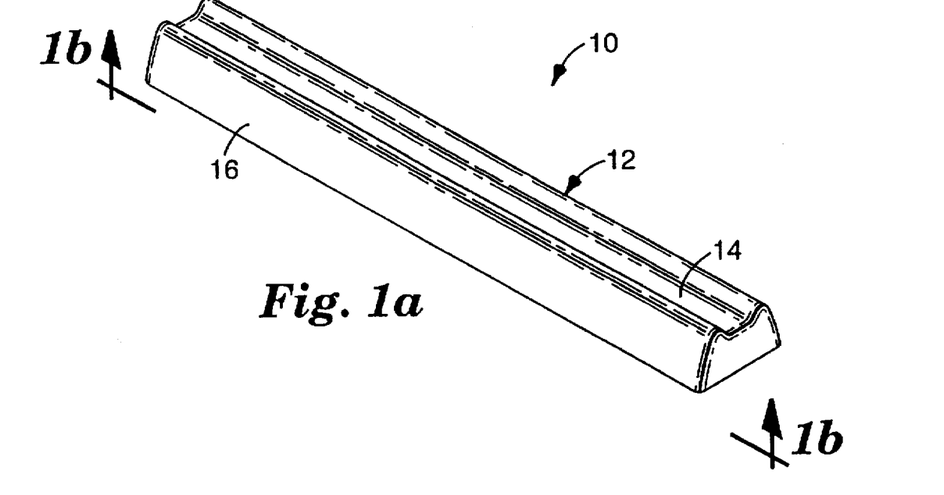
FIG. 1(a) is a perspective view of an affixation member according to an embodiment of the present invention.
Figure 1B:
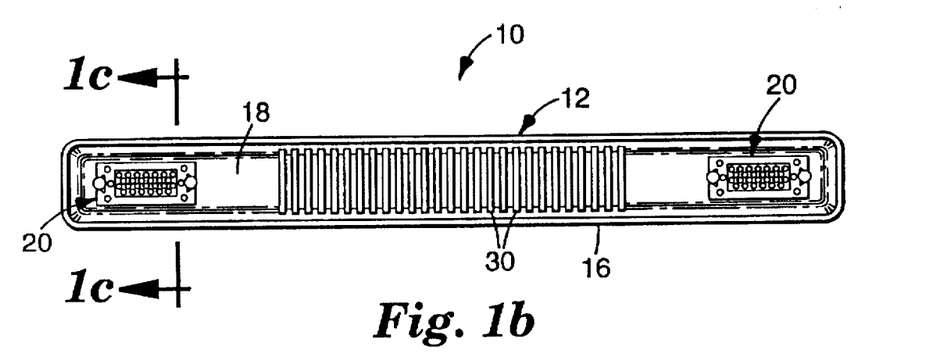
FIG. 1(b) is a bottom view of the affixation member of FIG. 1(a) seen from an arrow A of FIG. 1(a)
Figure 1C:
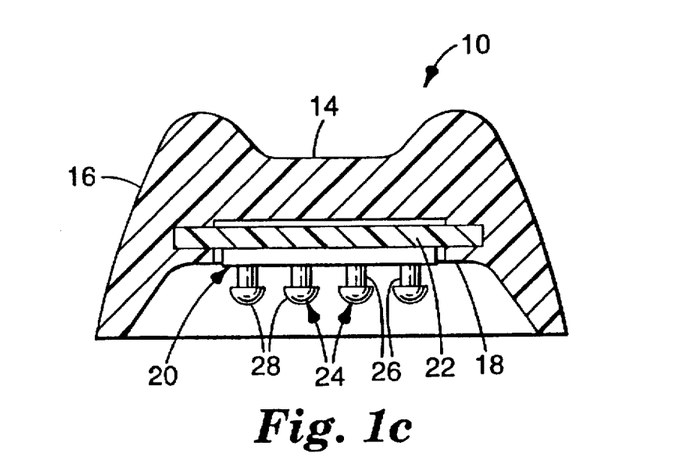
FIG. 1(c) is an enlarged sectional view taken along line B—B of FIG. 1(b)

FIG. 1 shows an affixation member 10 according to one embodiment of the present invention. The affixation member 10 has a body 12 preferably made of a polymeric material. The body 12 has a shaped top surface 14 and a bottom surface 18 surrounded by side walls 16. The affixation member 10 can be used, for example, for a protection molding for protecting a body panel of a car.

Figure 2A:
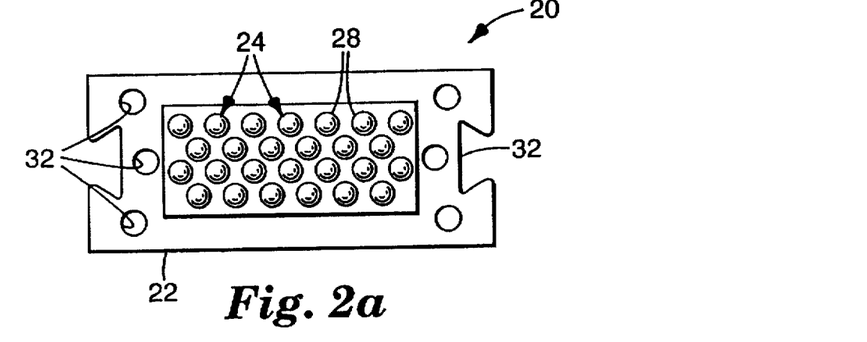
FIG. 2(a) is a plan view of a fastener member use with the affixation member of FIG. 1.
Figure 2B:
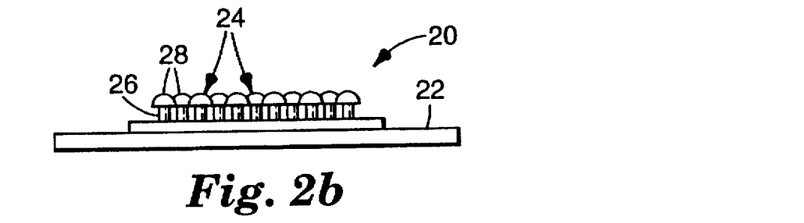
FIG. 2(b) is a side view of the fastener member of FIG. 2(a), taken from arrow C.

Fastening means in the form of an interengaging fastener member 20 are mounted on the bottom surface 18 of the body 12 at opposite ends thereof. Each fastener member 20 is preferably made of a unitary polymeric material, and includes, as shown in FIGS. 1(c) and 2, a base 22 to be fixed to the body 12, and a plurality of headed stems 24 arranged on the base 22 in a predetermined spaced relationship. Each headed stem 24 has a stem 26 adjoining and projecting substantially orthogonally from the surface of the base 22, and head 28 connected to the end of the stem 26. The head has a diameter at least one location that is greater than the diameter of the stem. A plurality of reinforcement ribs 30 are formed on the bottom surface 18 of the body 12 between a pair of longitudinally extending side walls 16.

The fastener members 20 are integrally secured to the body 12, preferably in an insert-molding process. In this case, as shown in FIG. 2 in an enlarged manner, each fastener member 20 preferably has a plurality of circular and wedge-shape cutouts 32 on the peripheral edge of the base 22 and in the vicinity thereof. These cutouts 32 are used during the insert-molding process for receiving a molten polymeric material of the body 12, so that the fastener member 20 can be fixedly secured on the body 12 after being molded. Some of the cutouts 32 may be used as a positioning hole when the fastener member 20 is located on the bottom surface 18 of the body 12. To secure the fastener member 20 to the body 12, an ultrasonic welding process or a high-frequency welding process can be adopted, as described in greater detail below.

Figure 3A:
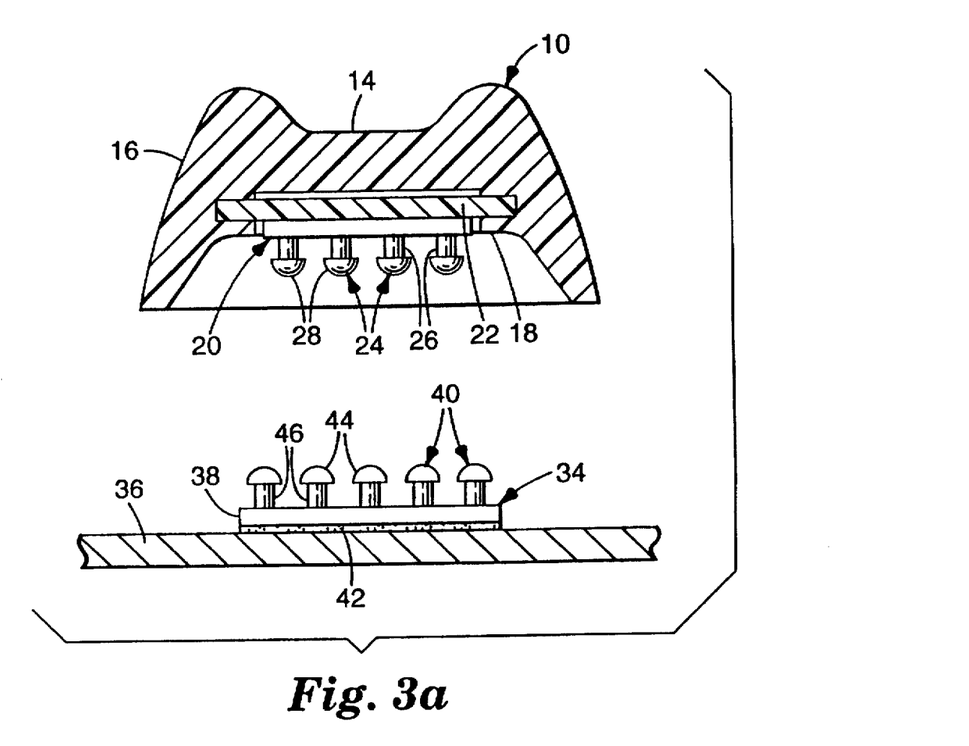
FIG. 3(a) is a sectional view of the affixation member of the present invention prior to attachment to a surface.
Figure 3B:
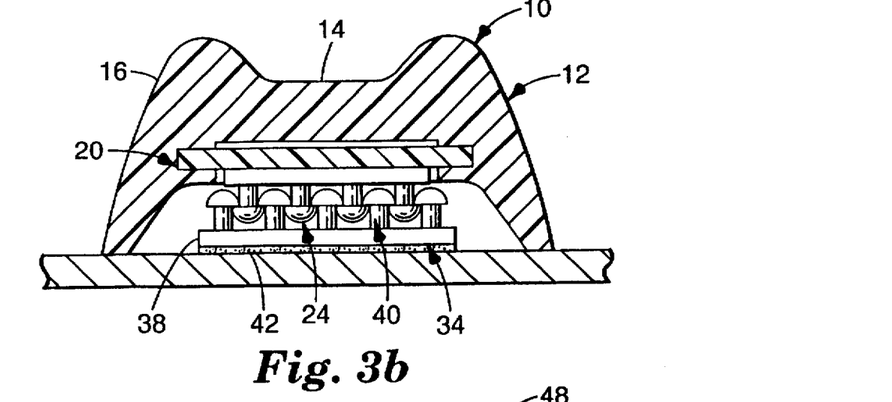
FIG. 3(b) is a sectional view of the affixation member of the present invention following attachment to a surface.

As shown in FIG. 3, the affixation member 10 is detachably mounted to a structure 36, such as a car body panel, by using a separate fastener member 34. The separate fastener member 34 has a base 38, and a plurality of headed stems 40 adjoining and projecting generally orthogonally from the base 38, and having substantially the same shape and arrangement as those of the headed stems 24 in the fastener member 20.

When the affixation member 10 is mounted to the structure 36, the fastener member 34 is fixed to the surface of the structure 36 at a predetermined position through, for example, a pressure-sensitive adhesive layer 42. The affixation member 10 is positioned so that the heads 28 of the headed stems 24 of the fastener member 20 confront the heads 44 of the headed stems 40 of the separate fastener member 34, as shown in FIG. 3(a), and the heads 28 of the headed stems 24 are brought into contact with the heads 44 of the headed stems 40. In this position, a predetermined pressure is applied to the top surface 14 of the body 12, so as to pass the heads 28 of the headed stems 24 of the fastener member 20 between the adjacent headed stems 40 of the fastener member 34. Consequently, the stems 26, 46 of the headed stems 24, 40 are elastically deflected and restored, and the heads 28, 44 of the headed stems 24, 40 are disposed between the adjacent stems of the opposed headed stems, as shown in FIG. 3(b). Thus, the heads of the headed stems 24, 40 are frictionally engaged with each other, whereby the affixation member 10 is secured to the surface of the structure 36 at a predetermined location.

In the affixation member according to the present invention, the headed stems of the fastening means can slightly move in the shearing direction generally orthogonally to the opposed headed stems while maintaining the interengagement with the opposed headed stems. To facilitate this movement more effectively, the headed stems 24 of the fastener member 20 are arranged in the longitudinal direction in a linear manner at a small pitch, but in the transverse direction in a zigzag manner at a larger pitch than the former. In addition, the fastener member 20 is secured to the body 12 so that the linear arrangement of the headed stems 24 of the fastener member 20 is directed to the longitudinal direction of the body 12 of the affixation member 10. Accordingly, it is possible to displace the heads 44 of the opposed headed stems 40 in the longitudinal direction along the linearly arrayed headed stems 24 of the fastener member 20, during the fastener member 20 is engaged with the separate fastener member 34. Even if the body 12 thermally expands in the high temperature environment, which would result in the detachment of the affixation member 10 from the structure 36 in the conventional mounting method, the free expansion of the body 12 in the longitudinal direction is allowable due to the relative displacement between the fastener member 20 and the separate fastener member 34, whereby the detachment of the affixation member 10 can be prevented.

Figure 4:
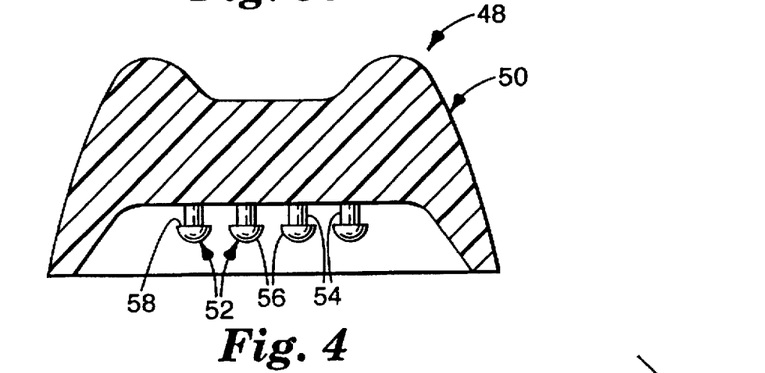
FIG. 4 is a sectional view of an affixation member according to another embodiment of the present invention.

In the above embodiment, the interengaging fastener member 20 is fixed to the body 12 of the affixation member 10 as fastening means, but the fastening means of the present invention is not restricted to this structure and, for example, may include headed stems directly formed on the bottom surface of the body at predetermined positions. FIG. 4 shows an affixation member 48 which includes integrally formed fastening means. The affixation member 48 includes a body 50, and a plurality of headed stems 52 arranged on the body 50 in a predetermined spaced relationship. Each headed stem 52 has a stem 54 integrally formed on and projecting from the body 50, and a head 56 connected to the end of the stem 54. Each headed stem 52 acts as fastening means for fastening the body 50 to the surface of the structure 36, as shown in FIG. 3.

In the above embodiments, the fastening means can be arranged at any position or positions on the body, and are preferably arranged near the outer periphery of the body to prevent the body from being raised on the surface of the structure when being attached to the structure. Further, the affixation member may be secured to the structure by using the conventional fixing means, such as an adhesive, a double-coated adhesive tape, or bolts, as well as by the inventive fastening means having headed stems.

The affixation member of the present invention may have various dimensions and shapes suitable for various use as mentioned above. In the above embodiment, for example, the affixation member 10 affixed to a car body structure may be attached to not only a body panel but also a bumper or other large sized molding. The interengaging fastener member 20 may have any dimensions and shapes, which can be fixed to the body 12 of the affixation member 10. For example, the base 22 may have any dimensions and shapes, which can firmly hold the headed stems 24. Also, to fix the fastener member 20 to the body 12, it is possible to provide a fixing means, such as hooks, on the base 22. The stems 26 of the headed stems 24 may be of a cylindrical, prismatic or frusto-conical shape, and more than two stems may be provided for a single headed stem. Also, it is possible to provide a radiused surface in a junction area between the base 22 and the headed stems 24, so that a stress concentration is prevented from occurring in the junction area when the stems 26 of the headed stems 24 are deflected. It is also possible to form grooves in the head 28, so as to reduce an engagement force required for the engagement with the separate fastener member 34.

A thickness of the base 22 of the fastener member 20 is preferably between 0.5 mm and 2.0 mm, for obtaining a sufficient mechanical strength and simplicity of insert-molding. An disengagement force of the affixation member 10 obtained due to the interengagement between the fastener member 20 and the separate fastener member 34 is preferably not less than 5 kgf/cm$^2$. In this case, preferably the stem 26 of the headed stem 24 has a diameter of between 0.4 mm and 2.0 mm, and a length of between 0.5 mm and 3.0 mm, and the head 28 has a maximum projected diameter of between 0.5 mm and 0.4 mm.

The affixation member of the present invention may be made of various materials. In the above embodiment, for example, the body 12 may be made of polymeric materials, such as polyvinyl chloride, polypropylene, or other engineering plastics. The fastener member 20 may be made of polymeric materials, such as polyamide resin, polyester resin, polypropylene resin, or polyethylene resin. The headed stems 24 may be made of the same polymeric material as that of the base 22. Particularly, the heads 28 are preferably made of a material having a bending modulus of elasticity in a range from 10$^3$ kgf/cm$^2$ through 10$^5$ kgf/cm$^2$ according to a measurement based on ASTM test method D790. The base 22 and the stems 26 of the headed stems 24 may be made of a high-strength material different from the material of the heads 28, for improved durability.

The affixation member of the present invention may be formed by various methods. The method of producing the affixation member 10, 48 according go the embodiments of the present invention will be described below, with reference to FIGS. 5 to 7. First, the method of producing the affixation member 48 which has headed stems 52 integrally formed on the body 50 is described, by way of example. This process is described in greater detail in U.S. Pat. No. 5,242,646 (Torigoe et al.), the contents of which is incorporated by reference herein.

Figure 5A:
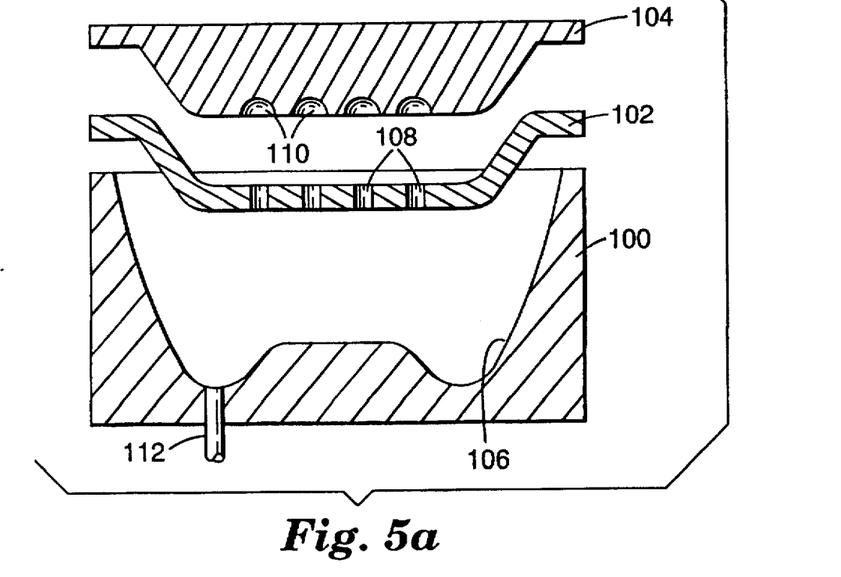
FIGS. 5(a), 5(b), and 5(c) illustrate a method for making an affixation member of the type shown in FIG. 4.

As shown in FIG. 5(a), a body mold 100 for molding the body 50 of the affixation member 48, a stem mold 102 for molding the stems 54 of the headed stems 52, and a head mold 104 for molding the heads 56 of the headed stems 52 are prepared. The body mold 100 is a permanent mold which can be released from the molded affixation member 48 without destruction thereof, and has a cavity 106 corresponding to the body 50. The stem mold 102 is a destructible mold which is destructively removed from the molded affixation member 48 in a manner as described below, and has a plurality of cavities 108 corresponding to the stems 54. The head mold 104 is a permanent mold which can be released from the molded affixation member 48 without destruction thereof, and has a plurality of cavities 110 corresponding to the heads 56. The cavities 106, 108 and 110 may have various contours corresponding to the desired shapes of the body 50, stems 54, and heads 56, as described above. Particularly, the stem mold 102 may have other shapes than illustrated one, so as to provide a desired flat or recessed portion to a lock surface 58 (see FIG. 4) of the head 56, which confronts the body 50, or so as to form the grooves in the head 56.

The stem mold 102 is durable as a core used in the injection molding process for forming the affixation member 48, and can be destructibly removed from the affixation member 48 by various means, after the affixation member 48 has been molded. For example, the stem mold 102 may be removed from the periphery of the stems 54 by various mechanical or chemical methods, such as dissolving with a solvent (e.g., water or alcohol), melting, disintegrating, shattering (e.g., by ultrasonic wave), or cutting, without damaging the affixation member 48. In a preferred embodiment, the stem mold 102 is made of a water-soluble material. In this case, the stem mold 102 can be removed from the affixation member 48 by immersing the mold in cold or hot water and vibrating the mold. The water-soluble materials suitably used for the present invention are disclosed, for example, in European patent Application No. 314,156 and U.S. Pat. Nos. 4,990,146 and 4,870,184. In this regard, the stem mold 102 may be formed in a desired shape by well-known injection molding process.

Figure 5B:
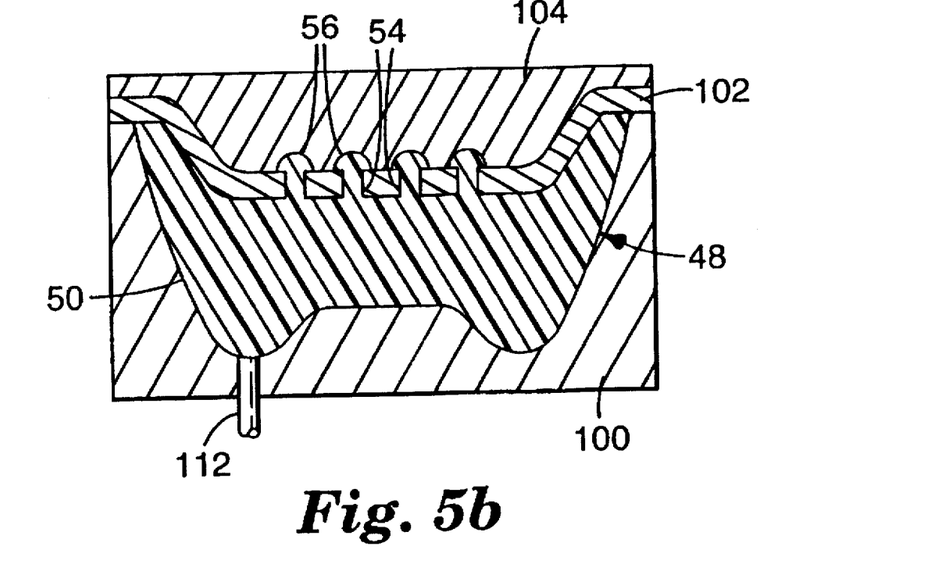

As shown in FIG. 5(b), the stem mold 102 is fixedly arranged between the base mold 100 and the head mold 104. The cavity 106 of the base mold 100, the cavities 108 of the stem mold 102, and the cavities 110 of the headmold 104 are connected with each other so that a fluid can flow therethrough. In this state, a molten polymeric material is flowed into the cavity 106 through an inlet passageway 112 provided in the body mold 100. In this regard, the inlet passageway for feeding the molten material may be provided in the head mold 104 so as to communicate with one of the cavities 110.

The molten material flowed into the cavities 106 of the body mold 100 fills the cavity 106 to form the body 50, then fills the cavities 108 of the stem mold 102 to form the stems 54, and finally fills the cavities 110 of the head mold 104 to form the heads 56. Thereafter, as the molten polymeric material is solidified, the affixation member 48 is integrally molded, which has the headed stems 52 connected at one end to the body 50 and at the other end to the heads 56.

Figure 5C:
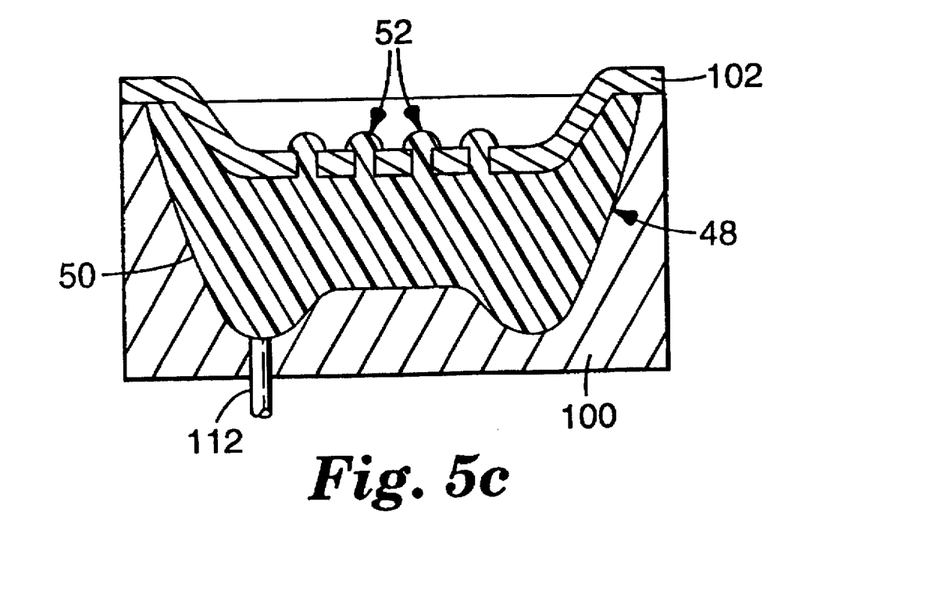

Once the affixation member 48 has been molded, the base and head molds 100, 104 are removed from the molded affixation member 48, while remaining the stem mold 102 (see FIG. 5(c)). Then, the stem mold 102 is destructably removed from the stems 54 of the headed stems 52 of the affixation member 48 by various means as described above. Thus, the affixation member 48 shown in FIG. 4 is completed.

Figure 6A:
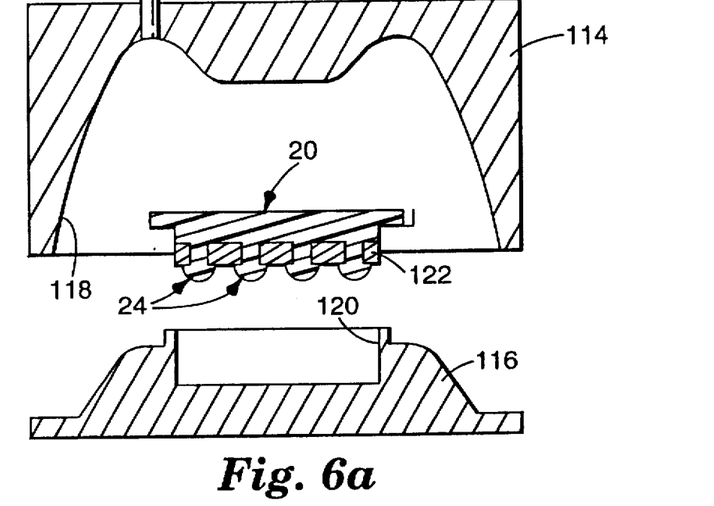
FIGS. 6(a), 6(b), and 6(c) illustrate a method for making an affixation member of the type shown in FIG. 1.
Figure 6B:
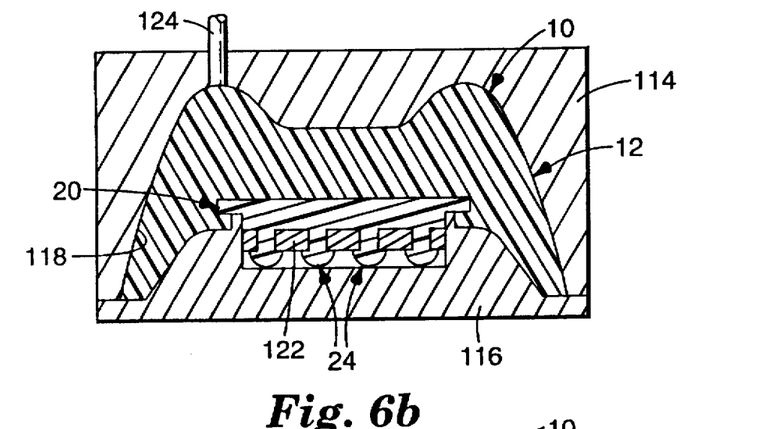
Figure 6C:
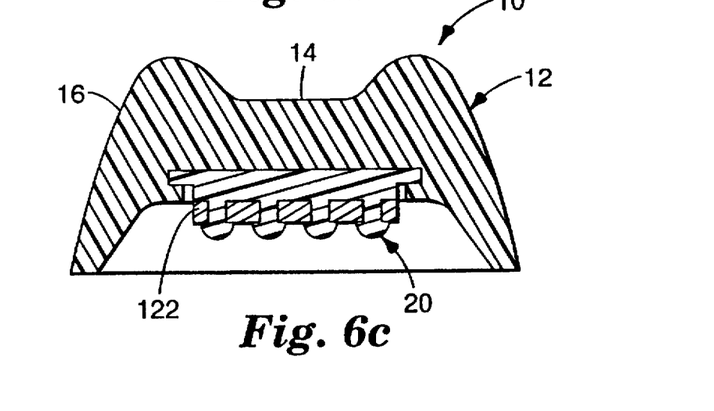

FIG. 6 schematically shows a method of producing the affixation member 10 of FIG. 1, by way of example.

According to the method of FIG. 6, the interengaging fastener member 20 molded through the other process is fixed to the body 12 at predetermined positions by an insert-molding process, to produce the affixation member 10. As shown in FIG. 6(a), a pair of molds 114, 116 for molding the body 12 are prepared. The mold 114 has a cavity 118 corresponding to the body 12, and the mold 116 has a space 120 for receiving the headed stems 24 of the fastener member 20.

The interengaging fastener member 20 may be molded through an injection molding process using a destructible stem mold, similar to the method shown in FIG. 5. The molded interengaging fastener member 20 is supported on the mold 116, while the headed stems 24 being inserted into the space 120 of the mold 116. In this regard, the molded fastener member 20 is preferably arranged while a stem mold 122 being remained around the stems 26 of the fastener member. Thereby, the headed stems 24 are protected from the heat of a molten material during the molding process of the body 12, and the molten material is prevented from entering between the adjacent headed stems 24. However, the interengaging fastener member 20 may be arranged in the cavity 118 after removing the stem mold 122.

As shown in FIG. 6(b), the mold 114 having the cavity 118 is connected to the mold 116 supporting the fastener member 20. Then, a molten polymeric material is flowed into the cavity 118 through an inlet passageway 124 provided in the mold 114. The molten material flowed into the cavity 118 fills the cavity 118, and thereafter, as being solidified, the body 12 is molded, which has the fastener member 20 fixed thereto at the predetermined positions. Once the body 12 has been molded, the molds 114, 116 are removed from the body 12 (see FIG. 6(c)). Then, the stem mold 122 is destructibly removed from the stems 26 of the headed stems 24 of the fastener member 20 by various means described above. Thus, the affixation member 10 shown in FIG. 1 is completed.

Figure 7:
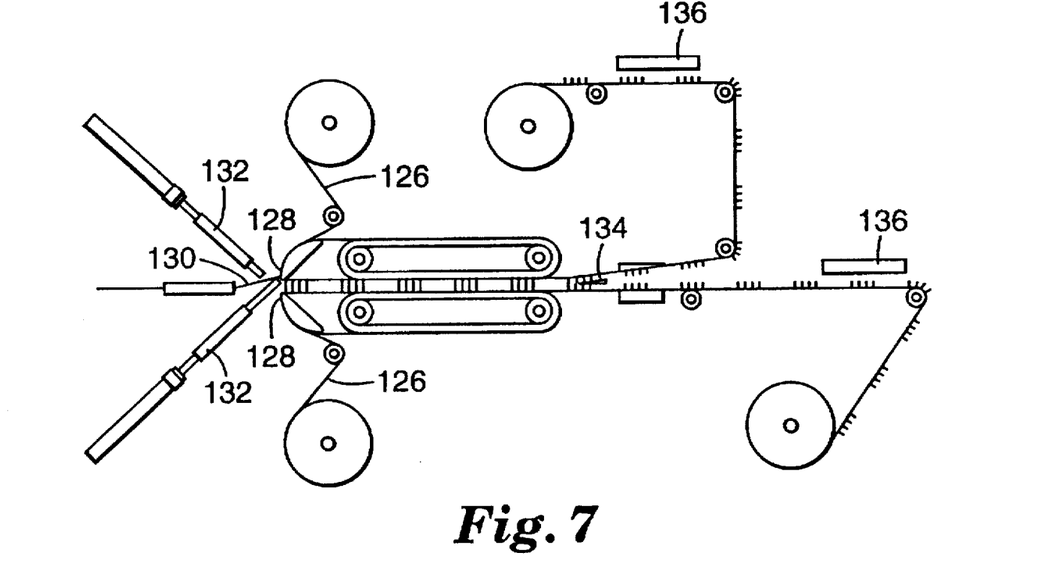
FIG. 7 illustrates a method for making an affixation member of the type shown in FIG. 4.

The affixation member having headed stems which are integrally formed with the body may be produced by another method shown in FIG. 7. The method of FIG. 7 is similar to that disclosed in U.S. Pat. No. 4,290,832, titled "Method for Making Fasteners." In the method of FIG. 7, a pair of continuous backing layers 126 are used for forming the body of the affixation member. In this regard, the body of the affixation member is preferably made of flexible materials. A pair of backing layers 126 are fed from generally opposite direction to a pair of arcuate spaced guides 128. After passing through the spaced arcuate guides 128, each backing layer 126 is moved along parallel paths extending in the same direction. The backing layers 126 fed in this manner are provided with a plurality of monofilaments 130 made of flexible, resilient polymeric materials. The monofilaments 130 are fed from the opposite side of the parallel paths regarding the arcuate guides 128, to the space between the arcuate guides 128 by a pair of feeding units 132. The feeding units 132 alternately operate to deflect the monofilaments 130 into U-shape, and to alternately plant them in two backing layers 126 passing through the arcuate guides 128 at predetermined positions. Consequently, the U-shaped lengths of the monofilaments 130 are alternately bonded to the backing layers 126, and linear lengths of the monofilaments 130 extending between the U-shaped lengths is formes in generally orthogonal to the backing layers 126 moving along the parallel paths. The monofilaments 130 formed between the backing layers 126 are severed at midway between the backing layers 126 by a cutting edge 134, as the backing layers 126 being moved. Consequently, a plurality of stems projecting from each backing layer 126 are formed. The stems formed from the severed monofilaments are heated to be deformed at the severed ends thereof, by heat sources 136 arranged at the downstream of the cutting edge 134. Consequently, heads having arcuate surfaces are formed at the ends of the stems. In this manner, a plurality of headed stems arranged at the predetermined positions on the backing layers 126 are formed. Finally, the bodies are formed by cutting the backing layers 126 into desired sizes, whereby the affixation member is finished.

Figure 8:
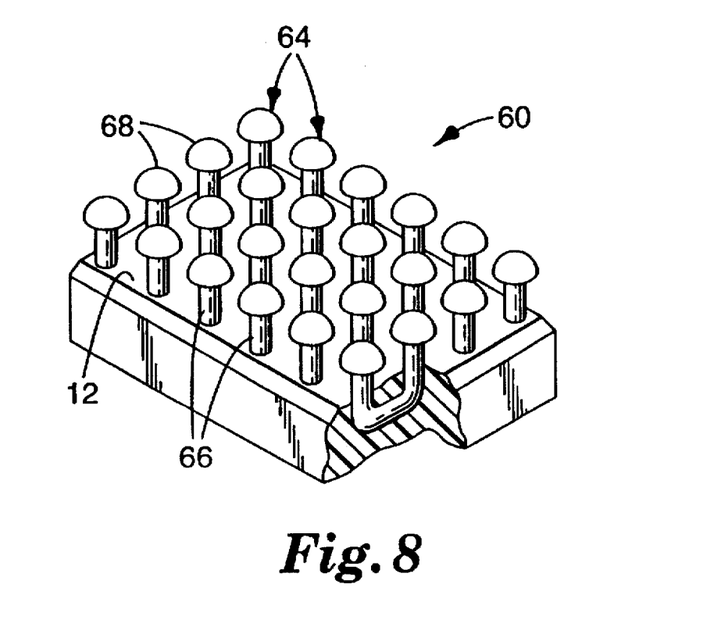
FIG. 8 is a partially cutout enlarged perspective view of an affixation member, according to the other embodiment of the present invention, made by the method of FIG. 7.

FIG. 8 shows an affixation member 60 made by above-mentioned process. A plurality of headed stems 64 are arranged on the body 62 of the affixation member 60 in a predetermined spaced relationship. The stems 66 of the headed stems 64 are bonded to the body 62 by planting the U-shaped lengths of the monofilaments into the body 62. Heads 68 are formed at the end of the stems 66 by thermal deformation.

As apparent from the above description, according to the present invention, an affixation member adapted to be attached to the surface of a structure as an affixation is provided, which can be quickly mounted to the surface and also can be easily detached therefrom without causing any damages, by the function of fastening means having headed stems. Accordingly, the repairing or repainting operation for structures is accelerated and simplified, and thus operational costs are reduced. Further, the headed stems of the fastening means can be slightly displaced in the direction transverse to the opposed headed stems, while being engaged with the opposed headed stems. Therefore, the thermal expansion of the body of the affixation member attached to the structure is a high temperature environment is allowable to a some extent, so as to prevent the affixation member from being peeled off, whereby the durability and appearance of the affixation member are improved.

The present invention has now been described with reference to several embodiments thereof. It will be apparent to those skilled in the art that many changes can be made in the embodiments described without departing from the scope of the invention. Thus, the scope of the present invention should not be limited to the structures described herein, but rather by the structures described by the language of the claims, and the equivalents of those structures.

We claim:

1. A method of making an affixation member comprising a body for affixation to a surface of a structure and means for fastening the body to the surface, the fastening means comprising an interengaging fastener member which includes a base secured to the body and a plurality of headed stems arranged on the base in a predetermined spaced relationship, each of the headed stems including a stem adjoining and projecting from the base and a head connected to a distal end of the stem, the method comprising the steps of:

a) providing a permanent base mold having a cavity for molding the base of the interengaging fastener member, a destructible stem mold having a plurality of cavities for molding the stems of the headed stems, and a permanent head mold having a plurality of cavities for molding the heads of the headed stems;

b) providing a permanent body mold having a cavity for molding the body of the affixation member;

c) securing the destructible stem mold adjacent the permanent base mold with the cavities of the stem mold in fluidic communication with the cavity of the base mold, and securing the permanent head mold adjacent to the destructible stem mold with the cavities of the head mold in fluidic communication with the cavities of the stem mold;

d) flowing a molten polymeric material into the base mold, the stem mold and the head mold through an inlet passageway in one of these molds, and integrally forming the base, and the stems and the heads of the interengaging fastener member from the polymeric material;

e) separating the base mold and the head mold from the destructible stem mold and the molded interengaging fastener member;

f) placing the destructible stem mold and the molded interengaging fastener member at a predetermined position within the cavity for molding the body in the permanent body mold;

g) flowing a molten polymeric material into the body mold through an inlet passageway in the body mold;

h) molding the affixation member fixedly supporting the interengaging fastener member at the predetermined position from the polymeric material within the body mold;

i) separating the body mold from the molded affixation member; and j) destructibly removing the stem mold from the interengaging fastener member fixedly supported on the molded affixation member.

2. The method of claim 1, wherein the step j) includes a step of dissolving the destructible stem mold with a solvent.

3. The method of claim 1, wherein the solvent is water.

* * * * *